(12) United States Patent
Thomas

(10) Patent No.: US 6,848,381 B2
(45) Date of Patent: Feb. 1, 2005

(54) TENSION ROD CONSTRUCTIONS AND METHOD OF MAKING

(76) Inventor: Georg K. Thomas, 461 Mill Springs La., Plantation, FL (US) 33325

(*) Notice: Subject to any disclaimer, the term of this patent is extended or adjusted under 35 U.S.C. 154(b) by 0 days.

(21) Appl. No.: 10/366,023

(22) Filed: Feb. 12, 2003

(65) Prior Publication Data
US 2004/0154516 A1 Aug. 12, 2004

(51) Int. Cl.⁷ .................................................. B63H 9/10
(52) U.S. Cl. ...................... 114/111; 114/102.1; 114/109
(58) Field of Search ............................. 114/102.1, 293, 114/230.2, 109, 111; 405/224

(56) References Cited

U.S. PATENT DOCUMENTS

| | | |
|---|---|---|
| 3,216,807 A | 11/1965 | Woodcock |
| 3,279,903 A | 10/1966 | Siegmund |
| 3,291,090 A * | 12/1966 | Sevey .......................... 114/109 |
| 3,681,911 A | 8/1972 | Humphries |
| 3,778,994 A | 12/1973 | Humphries |
| 3,784,732 A | 1/1974 | Whitfill, Jr. |
| 4,445,957 A | 5/1984 | Harvey |
| 4,477,636 A * | 10/1984 | Muroi et al. ................. 156/332 |
| 4,863,804 A | 9/1989 | Whitlow et al. |
| 5,128,192 A | 7/1992 | Narasaki |
| 5,307,615 A | 5/1994 | Walton et al. |
| 5,393,470 A | 2/1995 | Miller |
| 5,463,970 A * | 11/1995 | Hartlmeier et al. ......... 114/105 |
| 5,742,715 A | 4/1998 | Boehlke et al. |
| 5,742,716 A | 4/1998 | Yamashita et al. |
| 5,869,178 A | 2/1999 | Kusy et al. |
| 5,879,425 A | 3/1999 | Jensen |
| 5,976,437 A | 11/1999 | Marrocco, III et al. |
| 5,989,376 A | 11/1999 | Kusy et al. |
| 6,221,491 B1 | 4/2001 | Kavesh et al. |
| 6,311,394 B1 | 11/2001 | White |
| 2003/0037529 A1 * | 2/2003 | Hanna et al. ..................... 57/7 |

FOREIGN PATENT DOCUMENTS

WO      WO 97/32710    *  9/1997

* cited by examiner

*Primary Examiner*—Sherman Basinger
(74) *Attorney, Agent, or Firm*—Pearne & Gordon LLP

(57) ABSTRACT

A pultruded composite tension rod of hexagonal cross section is provided, as are larger composite rods made up of assemblies of smaller, nested-together parallel hexagonal tension rods that are re-pultruded together. A manufacturing process involving assembling and re-pultruding the smaller rods is also disclosed.

12 Claims, 1 Drawing Sheet

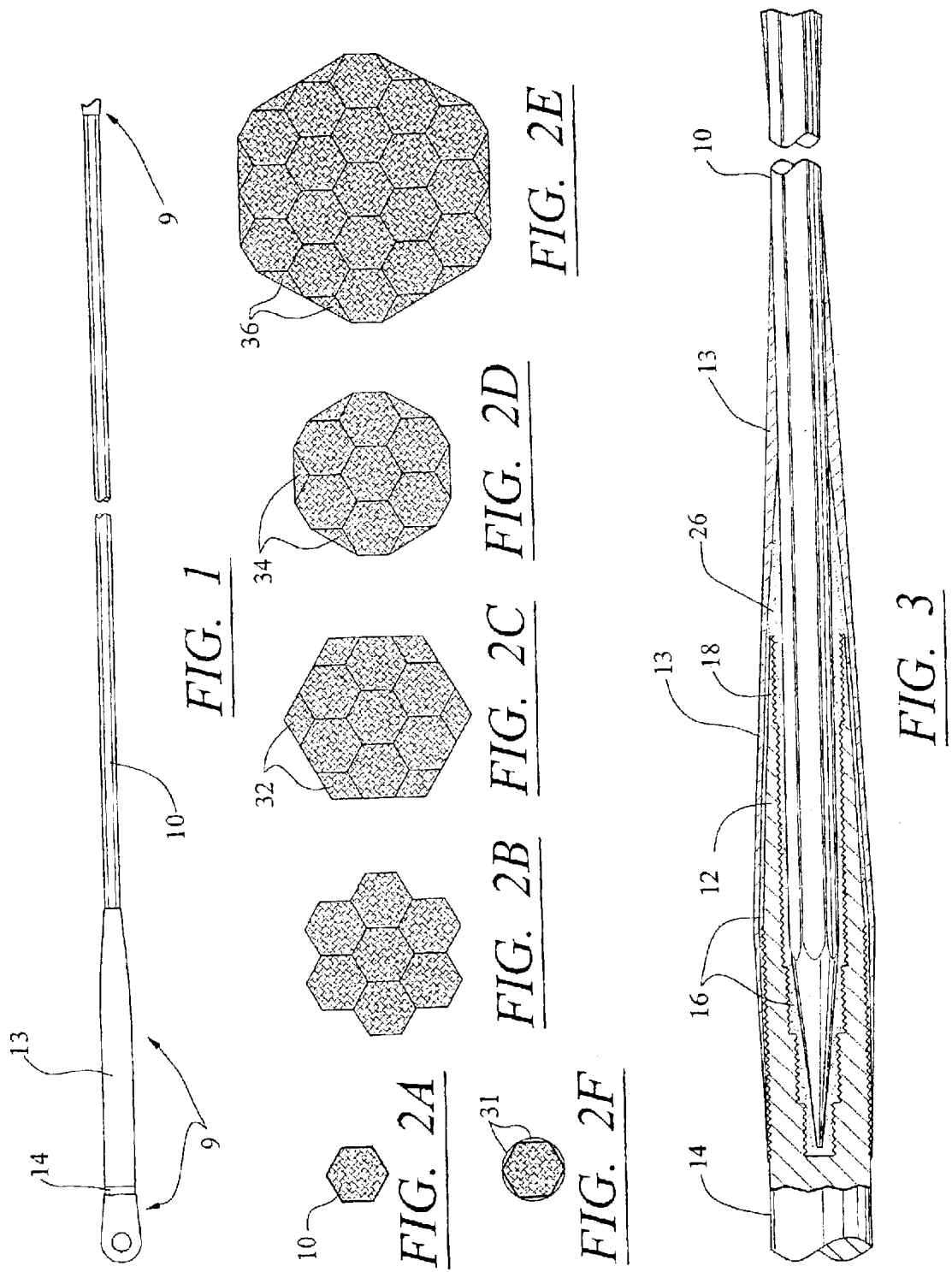

TENSION ROD CONSTRUCTIONS AND METHOD OF MAKING

FIELD OF THE INVENTION

This invention relates to composite fiber-reinforced resin tension rods, or cables made up of multiple rods, generally formed by pultrusion, hereinafter collectively referred to as fiber-reinforced composite rods, fiber-reinforced rods, composite tension rods, or as composite rods, or tension rods, or simply rods, and comprising carbon-fiber-reinforced resins, or resins reinforced with other fibers, and having the properties of geometric slimness and high tensile strength per unit weight. "Other fibers" includes fibers such as Kevlar®, Spectra®, Zylon®, and Twaron® brands of fiber, and, in general, fibers or blends of fibers that provide high tensile strength per unit weight when combined with a polymer resin matrix.

Composite tension rods differ from ropes or lines made of strands of twisted fibers consisting of fiber materials that are the same or similar to the fiber materials just mentioned. Unlike ropes or lines made of strands of twisted fibers, composite tension rods are essentially creep-free, have good resistance to abrasion, and are dimensionally stable under handling or coiling.

This invention provides improvements in composite tension rod construction that are of particular advantage in certain applications, for example in rigging line for sailing vessels, and improvements in methods of making and supplying tension rods. Rods of such improved construction may be used in various terminal systems, including systems with terminal fittings of conventional or known construction, and systems with terminal fittings of novel construction such as those disclosed in my pending application Ser. No. 10/366043, filed Feb. 12, 2003 concurrently with this case, and entitled COMPOSITE TENSION ROD TERNINAL SYSTEMS, or with other fittings that may be developed in the future.

The improved composite tension rods of the invention provide advantages over conventional composite tension rods by, among other things, reducing rod vibration, better indicating wear and need for replacement, enabling ready determination of the absence of torque without having to release the rod, simplifying manufacture and lowering manufacturing costs, and lending themselves to being combined to form rods of larger cross-section with minimal reduction of fiber density and at lower cost than forming such rods of larger cross-section in one single pultruding step.

The improved composite tension rods of the invention are formed as pultrudates of hexagonal cross-section. As used in this disclosure, "pultrudate" refers to the physical product that comes out of a pultrusion die, just as "extrudate" refers to the physical product that comes out of an extrusion die.

BRIEF DESCRIPTOIN OF THE DRAWINGS

FIG. 1 is a fragmentary view showing a tension rod of hexagonal cross-section with terminal fittings at either end. Only a small part of the fitting at the right end is seen FIG. 2A is a cross-section of the hexagonal tension rod of FIG. 1 taken on a larger scale.

FIG. 2B is a cross-section of a tension rod comprising an array of seven nested parallel tension rods, each similar to the rod of FIG. 2A.

FIG. 2C is a cross-section of a pultrudate that includes the rods of FIG. 2B and additional resin and fibers.

FIG. 2D is a cross-section of an alternate form of pultrudate.

FIG. 2E is a cross-section of another pultrudate.

FIG. 2F is a cross-section of a pultrudate having a built up circular shape at its end.

FIG. 3 is a cross-sectional view, partly broken away, showing details of one of the terminal fittings seen in FIG. 1.

DETAILED DESCRIPTION OF THE INVENTION

FIGS. 1 and 2A show a composite carbon-fiber-reinforced tension rod 10 that is generally many times longer than its flat-to-flat diameter. The rod 10 may constitute for example a shroud or other rigging line on a sailing vessel. Along most or almost all of its length, the rod 10 is hexagonal in cross-section rather than round.

As shown in FIG. 1, each end of the rod 10 may be provided with a terminal fitting 9. The two terminal fittings 9 may be of identical or different construction. Each end of tension rod 10 interacts with its associated terminal fitting to transfer tensile loads from the rod to the fitting, or from the fitting to the rod, so that together each terminal fitting, and the end of the rod associated with that terminal fitting, constitute a terminal system for transferring loads to and from the tension rod.

The rod 10 is formed by pultrusion using a hexagonal die opening. Pultrusion through the hexagonal die produces rod 10 of hexagonal cross-section.

The pultrusion die for manufacturing hexagonal composite tension rod of a given size may be made using ASTM Alloy 316 stainless steel hex rod or other hex rod of the same size. For example, to make a tension rod of ¼ inch size, six lengths of stainless steel hex rod of the same size are clamped around a ¼ inch round rod of suitable low-friction, high-temperature-resistant, high-compressive-strength plastic, for example Torlon brand plastic round rod, temperature resistant to over 400 degrees F. and available through McMaster Carr Catalog. Master Bond 10HT epoxy is then applied to the exterior grooves and the stainless hex rods are bonded together in the oven at 250 degrees F. Or, since the 10HT epoxy is a heat insulator and may unduly inhibit transfer of heat from a heat source, such as a surrounding oil jacket, to the interior die surface when the die is in use, a metal babbit is instead cast around the hex rods to hold them together. After cure and/or cooling, the internal plastic rod is pushed out with a smaller steel rod. After removal of the internal plastic rod the result is a hex die with a die cross-section of the desired configuration.

In a presently preferred method of production, carbon fibers are pulled through the epoxy resin and into the die cavity at a fiber ratio in the range of 60% to 70%. The die is jacketed with a larger diameter pipe with sealed ends between die and pipe at each end. Hot oil is pumped into one end of the pipe and exits from the other end to be circulated back through a heating source. Thermocouple-controlled electrical heating elements may be used instead, but use of heated oil is believed to give better heat uniformity. Suitable carbon fiber material for these purposes was obtained from A&P Technologies, which provided sample material of longitudinally oriented carbon fiber covered by a braid of Kevlar®. The Kevlar braid, designated E58125X, was removed and the carbon fiber material used. Epoxy material suitable for test purposes was Gougeon 105/206 epoxy, which is a bit viscous for fiber bonding but did actually penetrate among the fibers and worked well enough to demonstrate the concept.

The particular fitting 9 seen at the left end of FIG. 1 happens to be an eye-type fitting, and has an metal eye element at its end, as shown. The fitting also has a metal shank 14 extending from the eye element. (In this particular design of terminal, most of the length of the shank 14 happens to be covered by a rod sleeve 13.) The rod 10 is received in an axially extending bore (not seen in FIG. 1) formed in the shank 14.

The eye element may have a threaded bore (not shown) in which exterior threading (not shown) on the shank is received, the eye element being turned down tightly on the shank to form a fitting, in this case an eye fitting. Or the shank and eye element can be joined by other means, for example adhesive or welding. Or the shank and the eye element can be integrally formed from a single piece of material.

The shank can join to or be integrally formed with parts other than an eye to provide other known types of fittings, such as a fork, tee, stud, nailhead, or stemball that interconnects with other elements to form an eye/jaw toggle, jaw/jaw toggle, stud terminal, or other connecting, tie-down, or hitching device, or the shank can be somewhat elongated and threaded for a required adjusting distance to function as part of a turnbuckle connection, or the shank can form part of still other types of fittings for still other kinds of connections, tie-downs, or hitches, for example but without limitation, cylinder terminal, shroud terminal, t-ball terminal, shackle, wedge, and in general all those kinds of fittings which are used or may come to be used.

The pultruded composite tension rod 10 of hexagonal cross-section described above is believed to be a novel article of manufacture both in and of itself, and when combined with a terminal fitting at one or both ends, as also described above. The integration of such a rod or rods, along with an associated terminal fitting or fittings, in the rigging system of a sailing vessel is also believed to be novel. The rod and associated terminal or terminals are integrated into the rigging system of a vessel by combining them with, and/or substituting them for, other rigging lines and associated fittings in the rigging system of the vessel.

Hexagonal composite tension rods have several advantages over conventional round composite tension rods. One is that rod vibration is reduced because rounds shed large alternating vortices that vibrate the rod laterally to the direction of airflow, while the corners or edges of the hex rod help eliminate or minimize this effect.

Another advantage of hexagonal composite tension rods over round rods is that, while it is generally desirable that rigging lines be free of torque, it is not possible to confirm that a rigging consisting of round rod is in fact torque-free without releasing the rod, which may be inconvenient to do, and could even be dangerous under heavy sailing conditions. The edges of the hex rod act as indicators to reveal rod twist and thereby show at all times whether the rod is torqued, and if so, to what degree.

Another advantage of hexagonal composite tension rods over round rods is that the edges of the hex rods will indicate chafe, wear and impact, thereby warning of early possible rod failure.

Still another advantage is the ease and relative low cost of making dies for pultruding hex rod by relatively low-cost means such as described above.

An important aspect and advantage of the concept of hexagonal composite tension rod is the ability to combine the hexagonal rods to form a larger rod (a cable, consisting of a non-twisted assembly of contiguous, parallel rods) with little or no significant reduction of fiber density. This aspect is illustrated diagrammatically in FIGS. 2A to 2E, the rod 10 in FIG. 2A being understood in this context to be a pultruded rod as such, not a rod combined with terminal fittings such as the fittings 9 in FIG. 1.

In this context, rod 10 in FIG. 2A is a pultrudate having the form of a single composite tension rod of hexagonal shape. This rod is the product of a first-stage pultrusion. The rod 10 may be inventoried as an article of commerce which may eventually be used as an individual tension rod, or cut into shorter rods, and it or its cut lengths may be each associated with their own terminal system or systems at one or both ends, or the rod 10 may be used as part of the feed stock in further pultrusions to make a larger size rod.

In the manufacture of one form of larger size rod, seven rods of the same size as rod 10 are arrayed parallel to each other. A cross-section of the array is shown in FIG. 2B. The core rod of the seven is coated with medium-viscosity resin ("glue") and the six perimeter rods, preferably with additional resin or glue applied to their common faces, are compressed against it and each other to form an assembly. A resin commonly used as pultrusion resin may be used, such as Dow Derakane 400 Series epoxy/vinyl ester resin. The resin is preferably selected to be sufficiently heat curable to activate in the heated die.

The assembly is then pultruded through a larger heated hexagonal die (having a flat-to-flat diameter three times that of rod 10) together with additional resin and fibers to form the pultruded cable seen in cross-section in FIG. 2C. This operation represents a second-stage pultrusion in the sense that some or all the components passing through the pultrusion die are products of earlier pultrusion. The areas 32 represent areas filled by added pultrusion resin and fibers fed through the larger die along with the seven-rod assembly. The hexagonal cable that is formed in this process is not twisted. Its flat-to-flat diameter is three times that of the rod 10. Its cross-sectional area is nine times that of the rod 10.

Less preferably, the assembly of a core rod and six perimeter rods is pulled through a die having the same die opening as the perimeter shape of the assembly seen in FIG. 2B, producing a six-ridged rod of the same cross-section as that perimeter shape, in which case the rod produced has a cross-sectional area seven times that of the rod 10. A reason this alternative is less preferred is the relatively high cost of a die of such shape, and the fact that it does not lend itself as well as does the rod of FIG. 2C to a further pultrusion step to be described below.

The cable of FIG. 2D is similar to the cable of FIG. 2C, except that the cross section of the cable of FIG. 2D is 12-sided and has a slightly smaller area than the cross-section of the cable of FIG. 2C, and the filled-in areas 34 are of different shape than the filled-in areas 32 of FIG. 2C. Here a 12-sided die is required, and the flats are of two different widths. Again, this alternative is less preferred than the FIG. 2C rod for much the same reasons as given in the preceding paragraph in respect of a pultrudate formed in the configuration of FIG. 2B.

A still larger hexagonal cable (not shown) having a flat-to-flat diameter three times that of the cable seen in FIG. 2C can be formed by assembling seven lengths of such cable parallel to each other, gluing and compressing them together, and pultruding them together with additional fibers and resin through a still larger heated die. This would involve a third-stage pultrusion and produce a hexagonal cable with a flat-to-flat diameter nine times that of the rod 10 and a cross-sectional area 81 times that of the rod 10.

A cable of intermediate size can be made by gluing up an array of seven rods as seen in FIG. 2B surrounded by 12 additional rods, as seen in FIG. 2E. All 19 rods are then fed together through the final die. This die can have the same cross-section as the array of rods to provide a finished outer periphery, or the die can be of other shape to provide for additional filled-in areas, such as the illustrated areas 36 having the shape of shallow triangles. This construction is a second-stage pultrudate.

It is to be noted that FIGS. 2B, 2C, 2D and 2E each portray an overall cross-section whose principal component is a tessellation of hexagonal sections, that in each figure this tessellation is centered on the center of the overall cross-section, and that in each figure both the tessellation and the overall cross-section have a rotational symmetry of 60 degrees. The same would be true of a cross-section of the un-illustrated rod that is described above in words only and whose diameter is nine times that of rod 10.

It is also to be noted that in forming cable from bonded rods, the use of hexagonal rods means that little if anything is lost in fiber density when the rods are combined. In contrast, the inability of round rods to nest together without gaps means that fiber density is considerably decreased when cable is formed from the bonded rods. Also, with round rods, bond lines are prone to be uneven in thickness.

The pultrusion process is typically used to form composite tension rods. Fibers are pulled through a resin bath and through a heated die of the desired cross-sectional shape. Because the fibers frictionally resist being pulled through the die, the fibers are aligned and pre-tensioned to some extent as the rod is formed and cured in the die. It has been found that smaller pultruded cross-sections typically have better properties than larger cross-sections. This is believed to be due to the fact that, for example, a rod of ½ the diameter of another will have ¼ the die surface but only ⅛ the number of fibers to be pulled, i.e., the tension per fiber is typically higher through the die for a small cross-section than for a larger cross-section. Also, the heated die cures the resin system, or contributes to its curing, and a small cross-section is more easily heated from the die surface than is a large cross-section.

As an example of the advantages of using the small hex rod to make larger shapes, suppose that the small hex can be pulled at the rate of 10 feet per minute, and that enough pull power is available to run 5 dies at a time. Then the small hex rod can be made at the rate of 50 feet per minute, so 800 feet can be made in 16 minutes. Suppose a special order is received for two 50-foot sections of large hex three times larger than the small hex. To fill the order, start with seven 100-foot lengths of the small hex rod, either in stock or pultruded on the spot, and trimmed as called for by the order. Proceed to make the larger size cable as described in connection with FIG. 2C, using additional new fiber and resin to form the filled-in areas 32. The pull rate through the larger heated hex die is about 5 feet per minute, or about 20 minutes to pull 100 feet. Last, the finished large hex is trimmed and cut to the two 50 foot lengths ordered.

To produce an equivalent product by directly pultruding the larger-size hex as a single rod would require considerably more pull power and heating time, and would involve a lower production rate and greater costs.

This foregoing process also can be used advantageously when pultruding rods (not shown) of shapes that are less regular than the rod shapes described above, such as rods of elliptical cross-section, or rods whose cross-section lacks rotational symmetry, such as rods of tear-drop cross-section.

In the manufacture of rods of such shapes, previously formed hex rods are nested together in parallel tessellated relationship in such number as to take up the majority or as much as possible of the opening of the die to be used, and are passed through the heated die along with additional fiber and resin to form the desired shape.

As indicated above, the hexagonal rods contemplated by the present invention may be used in various terminal systems, including systems with terminal fittings of conventional construction, and systems with terminal fittings of novel construction such as those disclosed in my aforesaid co-pending application, or with other fittings that may be developed in the future.

However, because of the relatively high strength of fiber-reinforced tension rods, conventional fittings may be relatively bulky and heavy compared to fittings such as shown in my aforesaid co-pending application. FIG. 3 shows one presently preferred form of construction for the terminal fitting 9, in which the terminal fitting is part of a terminal system and fitting generally similar to the terminal system and fitting shown in FIG. 2E of my aforesaid co-pending application, a difference being use of round rod in such system described in my aforesaid co-pending application, as contrasted with the use of hexagonal rod in the system shown in FIG. 3 of the present application. FIG. 2E and the description thereof in the specification of such co-pending application are incorporated herein by reference, as are FIGS. 2A, 2B, 2C, 2D, 2F-1 and 2F-2, 2G- and 2G-2, 2H-1 and 2H-2, and 2J and the descriptions thereof.

FIG. 3 illustrates a terminal system that accomplishes both "inside" and "outside" shear-load transfer (i.e., accomplishes load transfer to and from the shank sleeve across or along, respectively, both the inside wall of the shank sleeve and the outside wall of the shank sleeve). Here the rod 10, bore 11, shank sleeve 12, shank 14 itself, layer of potting resin 16, and the shank sleeve end portion 18, act in concert under tension loads in such a way as to avoid or minimize any tendency toward "load dumping" at the entry point of the rod into the bore, or at the rod end. The rod and shank sleeve are spaced from each other throughout the length of the bore, and the spacing is filled by the cured potting resin to form a resin layer between the rod and the inside wall of the sleeve. The resin layer and the rod are secured to each other against relative longitudinal movement, as are the resin layer and the shank sleeve.

In addition, the rod sleeve 13 is provided, consisting of composite fiber material. This sleeve 13 is fixed to the rod proper 10 at a region spaced from the entry end of the bore 11. The rod sleeve 13 extends from such region past the entry end of the bore 11 and over the distal end of the shank sleeve 12 (i.e. over the end portion 18 of the shank sleeve). From there, the rod sleeve 13 continues along the shank sleeve 12 on the outside thereof along all or a majority of the length of the shank sleeve. The rod sleeve is bonded to the shank sleeve by an outer layer of resin 16 between these two elements. As seen in the illustration, the rod sleeve 13 is tapered so that its wall thickness decreases to a minimum in the vicinity of the proximal end of the shank sleeve, thereby avoiding load dump in such vicinity where the bond line between the rod sleeve and the shank sleeve starts. Similarly, tapering of the shank sleeve down to a minimum at its end portion 18 avoids load dump at that vicinity where the bond line between the rod sleeve and the shank sleeve starts from the other direction.

A fill 26 of potting resin supports the rod sleeve 13 between the end portion of the shank sleeve and the region where the rod sleeve is bonded to the rod proper 10. The fill 26 adds bonding surface to the system, and advantageously tends to eliminate bending stresses where the rod 10ƒ enters the fitting.

The rod sleeve 13 may be constructed of small ribbons or "tows" of fiber filaments, available in various grades expressing quantity of fibers in a tow. Tows of grades 6*k* and 18*k* were used in making up the sleeve. The tows are applied with sizing or hair-spray type binder that is compatible with the potting resin, and the potting resin also acts as a binder for the tows. Resin is applied to the tows, the tows are dipped in a resin bath and excess resin is removed with a light squeeze of gloved fingers, fibers are smoothed down on the rod surface and on the outside of the shank sleeve, heat shrink tubing (available at Pep Boys) is applied over the fibers and heated to with heat gun and a milking action is used to squeeze out excess resin and tension the fibers. The sleeve is allowed to cure and the heat shrink may then be removed. The taper of the rod sleeve down onto the rod may be formed by grinding (sandpapering) as may the taper of the rod sleeve onto the shank or shank sleeve in the vicinity of the proximal (leftward) end of the illustrated shank sleeve.

The "inside-outside" load transfer system illustrated in FIG. 3 embodies the concept of lowering the shear stress on the bond line by increasing the bond area by roughly a factor of two, or reducing the length of the fitting by approximately half, or some combination of each whereby both the bond area is increased and the fitting length is decreased to some degree. Note that in the system illustrated in FIG. 3, not only does the diameter of the rod proper increase as the thickness of the shank sleeve decreases to thereby provide complementary dual tapering, but the thickness of the rod sleeve wall decreases as the thickness of the shank sleeve wall increases to augment the complementary dual tapering.

Although complementary dual tapering is very advantageous in minimizing or avoiding load dumping, it is to be noted that the increase in bond area though provision of an "inside-outside" load transfer system inherently tends to reduce maximum load intensities and the incidence of load dumping, and is advantageous in and of itself irrespective of tapering.

As noted in my aforesaid co-pending application, the interior of the shank sleeve may be threaded in any of the terminal systems of any of the terminal system embodiments of my aforesaid co-pending application, including that of FIG. 2E, and the same is true of the terminal system shown in FIG. 3 of the present application, as illustrated. Similarly, threading may be used on the exterior of the shank 12, as illustrated.

In the terminal system of FIG. 3, the rod cross-section is hexagonal even within the associated fitting. Instead, the hexagonal cross-section of the rod may be built up to a circular cross-section at the rod's end, where the rod extends within the a fitting, so as to more closely conform the rod to the shape of the bore of the terminal fitting. Such circular cross-section of a built-up portion of the rod is seen in FIG. 2F. The rod end may be built up simply by using tows dipped in a resin bath and then applied to the sides of the rod as fill, and heated to cure. The built-up rod ends then may be ground (sandpapered) to the circular shape seen in FIG. 2F. The built-up rods in their final form consist in part of fill 31 that remains after grinding.

Although these details of these preferred terminal systems and fittings are not part of the presently claimed invention, it is nevertheless believed desirable to directly set forth a description of a presently preferred fitting, namely the fitting shown in FIG. 3, as has been done above, and to incorporate by reference the descriptions of the other embodiments of my co-pending application, as has also been done above. All of these can be used with fiber-reinforced tension rods that are hexagonal in cross-section along most or all of their free length, as well as with tension rods that are for the most part round in cross-section along their free length as described in my aforesaid pending application.

The invention is not intended to be limited to details of the above disclosure, which are given by way of example and not by way of limitation. Many refinements, changes and additions to the invention are possible without departing from the scope of the following claims as properly interpreted.

What is claimed is:

1. A tension rod combined in the rigging system of a sailing vessel and forming at least one rigging line in said rigging system, said rod comprising a pultrudate of composite material, said material comprising fiber-reinforced resin, said pultrudate having a hexagonal cross-section, said pultrudate having a terminal fitting on at least one end.

2. A tension rod comprising a first-stage pultrudate of composite material, said material comprising fiber-reinforced resin, said rod being one of an assembly of like rods bonded together by heat-curable resin in parallel relationship with each other and forming at least the principal part of a second-stage pultrudate, said second-stage pultrudate having an overall cross-section whose principal component is a tessellation of hexagonal sections each corresponding to its own associated one of said like rods, said tessellation being centered on the center of the overall cross-section of said second stage pultrudate, and said tessellation having a rotational symmetry of 60 degrees.

3. An article as in claim 2, said rod being one of an assembly of at least 7 like rods, including a core rod and 6 surrounding rods, nested together in parallel relationship and pulled through a second-stage pultrusion die to form a larger rod having a cross-sectional area at least 7 times that of each of the assembled rods.

4. A tension rod comprising a first-stage pultrudate of composite material, said material comprising fiber-reinforced resin, said rod being one of an assembly of like rods nested together in parallel relationship and forming at least the principal part of a second-stage pultrudate, said second-stage pultrudate having an overall cross-section whose principal component is a tessellation of hexagonal sections each corresponding to its own associated one of said like rods, said tessellation being centered on the center of the overall cross-section of said second stage pultrudate, and said tessellation having a rotational symmetry of 60 degrees, said assembly being an assembly of at least 7 like rods, including a core rod and 6 surrounding rods, nested together in parallel relationship and pulled through a second-stage pultrusion die to form a larger rod, said larger rod having a hexagonal cross-sectional area nine times that of each of the assembled rods, $2/9$ of said latter cross-sectional area being filled by resin and fiber pultruded with and in addition to the resin and fiber in said assembly of like rods.

5. An article as in claim 2, said article having a fiber density close to that of each of the nested rods.

6. A method of making composite tension rods comprising the steps of nesting together in parallel relationship a given number of hexagonal composite rods of fiber-reinforced resin each formed as a first-stage pultrudate and pulling said nested rods together through a heated pultrusion die to bond them together using heat-curable resin and form a second-stage pultrudate comprising a larger rod having a cross-sectional area at least as many times greater than the cross-sectional area of each of the nested rods as said given number and having a cross-section that includes a tessellation of the cross-fsections of the nested rods.

7. A method as in claim 6, said step of nesting together comprising nesting together at least seven hexagonal composite rods of fiber-reinforced resin, said step of pulling said nested rods together through a heated pultrusion die resulting in the formation of a larger rod having a cross-sectional area at least seven times greater than the cross-sectional area of each of the nested rods.

8. A method of making composite tension rods comprising the steps of nesting together in parallel relationship a given number of hexagonal composite rods of fiber-reinforced resin and pulling said nested rods together through a heated pultrusion die to form a larger rod having a cross-sectional area at least as many times greater than the cross-sectional area of each of the nested rods as said given number and having a cross-section that includes a tessellation of the cross-sections of the nested rods, said step of pulling said nested-together rods through a heated pultrusion die including the steps of accompanying said nested-together rods with additional fiber and resin as they are pulled into the die, and passing the nested-together rods and the additional fiber and resin through a die opening that is greater in area than the combined cross-sectional areas of said nested-together rods.

9. A method of making composite tension rods comprising the steps of nesting together in parallel relationship a given number of hexagonal composite rods of fiber-reinforced resin and pulling said nested rods together through a heated pultrusion die to form a larger rod having a cross-sectional area at least as many times greater than the cross-sectional area of each of the nested rods as said given number and having a cross-section that includes a tessellation of the cross-sections of the nested rods, said step of pulling said nested-together rods through a heated pultrusion die including the steps of accompanying said nested-together rods with additional fiber and resin as they are pulled into the die, and passing the nested-together rods and the additional fiber and resin through a die opening that is greater in area than the combined cross-sectional areas of said nested-together rods, said die opening being hexagonal, and said aforesaid steps forming hexagonal rod.

10. A method of making composite tension rods comprising the steps of nesting together in parallel relationship a given number of hexagonal composite rods of fiber-reinforced resin and pulling said nested rods together through a heated pultrusion die to form a larger rod having a cross-sectional area at least as many times greater than the cross-sectional area of each of the nested rods as said given number and having a cross-section that includes a tessellation of the cross-sections of the nested rods, said step of pulling said nested-together rods through a heated pultrusion die including the steps of accompanying said nested-together rods with additional fiber and resin as they are pulled into the die, and passing the nested-together rods and the additional fiber and resin through a die opening that is greater in area than the combined cross-sectional areas of said nested-together rods, said die opening being hexagonal, said aforesaid steps forming hexagonal rod, said method further including the steps of nesting together said last-named hexagonal rod with other hexagonal rod of like size and shape, and including said nested-together rods as feedstock in performing a higher-stage pultrusion to form a still larger rod having a cross-section that includes a tessellation of the cross-sections of the nested rods used as feedstock.

11. A method of making composite tension rods as in claim 6, said method of claim 6 being integrated into a method of making and supplying two different sizes of composite tension rods, said latter method comprising the steps of: (1) forming hexagonal composite rods of relatively small size as first-stage pultrudate, and (2) using (a) some of said first-stage pultrudate for supplying purchasers of rods of said relatively small size and (b) other of said first-stage pultrudate as feedstock in the practice of said method of claim 6 to form composite rods of relatively large size as second-stage pultrudate, said second-stage pultrudate being usable for supplying purchasers of rods of said relatively large size.

12. A method as in claim 6, said step of nesting together comprising nesting together at least seven hexagonal composite rods of fiber-reinforced resin, said step of pulling said nested rods together through a heated pultrusion die resulting in the formation of a larger rod having a cross-sectional area in excess of seven times greater than the cross-sectional area of each of the nested rods.

* * * * *

UNITED STATES PATENT AND TRADEMARK OFFICE
CERTIFICATE OF CORRECTION

PATENT NO.    : 6,848,381 B2
DATED         : February 1, 2005
INVENTOR(S)   : Georg K. Thomas It is certified that error appears in the above-identified patent and that said Letters Patent is hereby corrected as shown below:

Column 1,
Line 37, please delete "TERNINAL" and insert therefor -- TERMINAL --.

Column 9,
Line 5, please delete "cross-fsections" and insert therefor -- cross-sections --.

Signed and Sealed this

Sixteenth Day of August, 2005

JON W. DUDAS
*Director of the United States Patent and Trademark Office*